United States Patent
Karol

[11] 3,803,929
[45] Apr. 16, 1974

[54] CONTROL SYSTEM INCORPORATING AN IMPROVED THREE-DIMENSIONAL CAM ARRANGEMENT

[75] Inventor: Joseph A. Karol, Orange, Conn.
[73] Assignee: Avco Corporation, Stratford, Conn.
[22] Filed: Oct. 5, 1972
[21] Appl. No.: 295,138

[52] U.S. Cl............... 74/99 R, 60/39.28 R, 74/107, 74/88, 60/39.27
[51] Int. Cl............................................ F16h 21/44
[58] Field of Search................ 60/39.28 F, 39.28 R; 74/23, 88, 99 R, 99 A, 107, 110

[56] References Cited
UNITED STATES PATENTS

| | | | |
|---|---|---|---|
| 3,029,599 | 4/1962 | Chandler | 60/39.28 R |
| 3,055,177 | 9/1962 | Liston | 60/39.28 T |
| 3,172,259 | 3/1965 | North | 60/39.28 R |
| 3,187,505 | 6/1965 | Plummer | 60/39.28 R |
| 3,579,978 | 5/1971 | Stams | 74/107 |
| 3,618,407 | 11/1971 | Amelio | 74/88 |

Primary Examiner—Clarence R. Gordon
Attorney, Agent, or Firm—Charles M. Hogan; Gary M. Gron

[57] ABSTRACT

A fuel control system for a gas turbine engine incorporates a three-dimensional cam providing a displacement output as a combined function of a pair of displacement inputs. The cam is guided for movement in a reference plane in two directions in response to the two displacement inputs. A contoured cam surface is defined by curves having a distance from the reference plane representing the relationship between the inputs and the displacement output of a follower abutting the cam surface.

8 Claims, 1 Drawing Figure

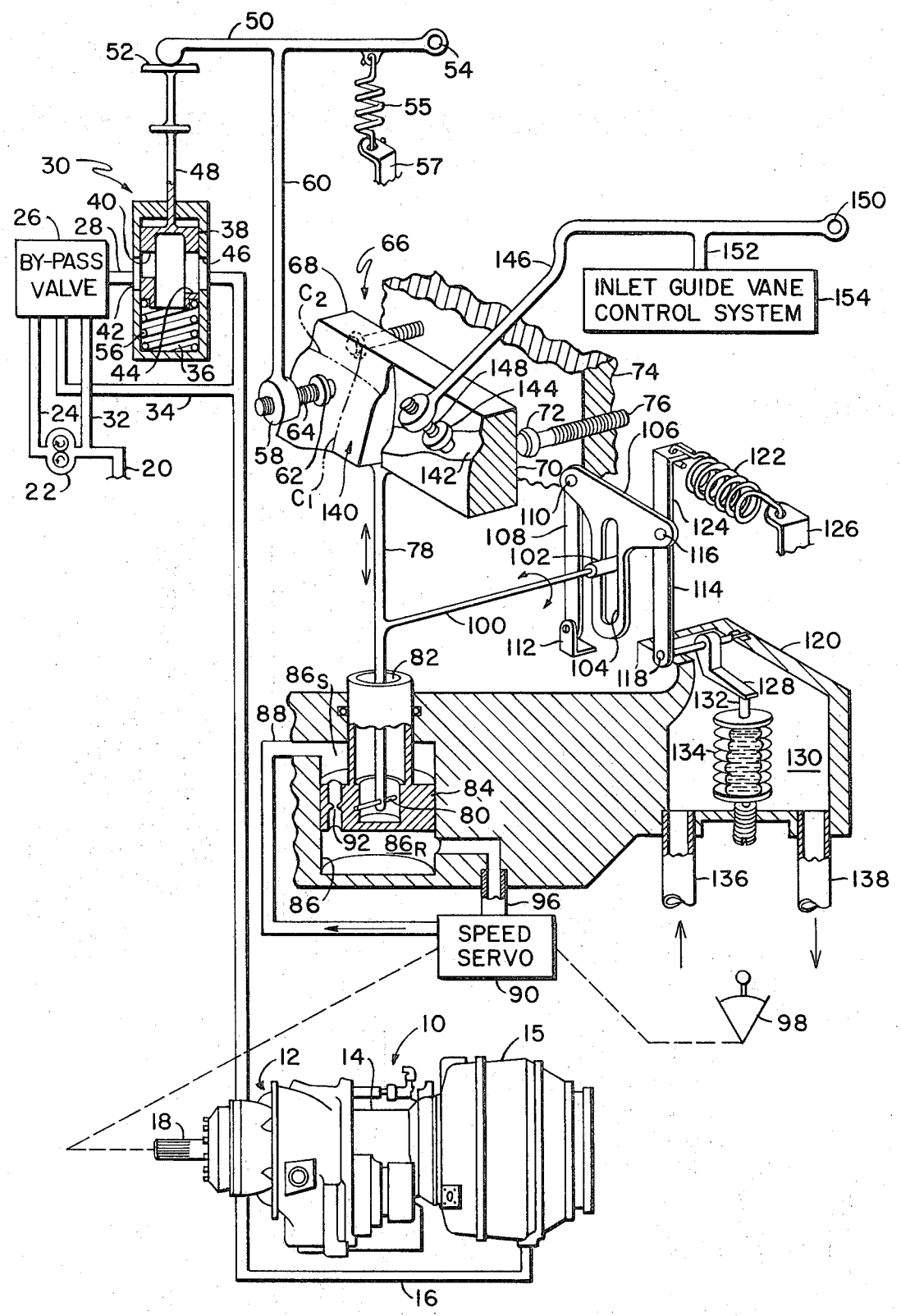

CONTROL SYSTEM INCORPORATING AN IMPROVED THREE-DIMENSIONAL CAM ARRANGEMENT

The present invention relates to cams and more specifically to cams which provide a displacement output as a combined function of a pair of displacement inputs.

The mechanical cam which provides a single output in response to a pair of inputs has an important function in a gas turbine engine fuel control system. The reason for this is that the engine fuel supply is controlled as a function of at least a pair of control inputs, e.g., rotor speed and input temperature. In the past, cams of this type have been formed around a barrel shape with linear displacement along the axis of the barrel representing the input from the first variable and rotational displacement about the axis of the barrel representing the input from the other variable. The contours are formed on the surface of the barrel and followers trace the contour and transfer the control information to an appropriate mechanism.

This approach is generally effective but there are a number of problems that can arise. One of the problems is that the cylinder must be properly journaled and guided for linear movement irrespective of the constantly varying side loads of the followers.

Therefore it is an object of the present invention to provide a highly effective, simplified and easily maintained cam mechanism which provides a displacement output as a function of a pair of displacement inputs.

These ends are achieved by a control system comprising a cam plate movable in a fixed reference plane and having a contoured cam surface. A follower abuts the cam surface and is displaceable generally normal to the reference plane. First and second means displace the cam plate in first and second directions in the plane in response to displacement inputs. The cam surface is defined by first and second sets of curves whose distance from the reference plane defines the relationship between the displacement inputs and the displacement of the cam follower.

The above and other related objects and features of the present invention will be apparent from a reading of the following description of the disclosure shown in the accompanying drawing and the novelty thereof pointed out in the appended claims.

In the drawing, the single FIGURE illustrates a cam mechanism embodying the present invention, together with the schematically illustrated components of a gas turbine engine fuel control system with which it may be used.

Referring to the drawing, there is shown a gas turbine engine fuel control system for use with a gas turbine engine 10. The engine 10 receives air through an inlet 12, pressurizes it in a compressor 14 for delivery to a combustor assembly 15 where fuel is injected from a series of nozzles (not shown) via nozzle supply conduit 16. The fuel and air are appropriately mixed and ignited to provide a hot gas stream which passes across a series of turbines to drive the compressor and also to provide a rotary output from an output shaft 18.

Metered fuel is supplied to the nozzle supply conduit 16 from a pump inlet supply conduit 20 connected with a suitable storage tank (not shown). The conduit 20 connects with a pump 22, generally engine driven, which pressurizes fuel for delivery to a conduit 24 through a bypass valve 26. A conduit 28 connects bypass valve 26 to a metering valve 30 which in turn is connected to nozzle supply conduit 16. The bypass valve 26 is a well-known component of a gas turbine fuel control system and acts to bypass fuel from the high pressure conduit 24 of pump 22 through return conduit 32 to the pump inlet in response to the pressure differential across metering valve 30. This pressure differential is supplied to the valve 26 by conduit 28 and a conduit 34 leading to nozzle supply conduit 16. The bypass valve 26 diverts a portion of the output from pump 22 in order to maintain a constant pressure differential across metering valve 30.

Metering valve 30 comprises a chamber 36 in which a hollow piston 38 is displaceable. Piston 38 has a metering port 40 which cooperates with an inlet port 42 to form, in combination, a variable area metering orifice. Outlet ports 44 in piston 38 and port 46 in chamber 36 are sufficiently large to provide discharge of the fuel irrespective of the position of piston 38. Piston 38 is longitudinally displaced by an input shaft 48 which is acted on by an arm 50 abutting flange 52 on shaft 48 and pivotally mounted to a suitable frame at 54. A light return spring 56 in chamber 36 suitably biases piston 38 against the follower 50.

Input arm 50 has an integral shaft 60 supporting a ball-type cam follower 62 at its free end through a threaded shaft 64 threaded into a disc 58. A spring 55, connected to a fixed bracket 57, pulls arm 50 downward.

Follower 62 receives an input from a cam assembly 66 embodying the present invention. The cam mechanism 66 comprises a cam plate 68 having a flat back face 70. Back face 70 abuts low friction tips 72 of at least two cam guides. Tips 72 are adjustably positioned with respect to a fixed housing 74 by threaded shafts 76. Follower 62 is mounted for displacement generally normal to the cam plate 68 by shaft 50. Spring 55, acting through arm 50 and shaft 60, biases follower 62 against the cam plate 68 and keeps the flat back face 70 against the tips 72 of the cam guides.

The cam plate 68 is displaced in the reference plane by a shaft 78 rigidly secured to plate 68 and pivotally connected to a shaft 80 secured in a bore 82 in a displacement piston 84. Piston 84 is displaceable in a chamber 86 and divides it into variable chambers $86_S$ and $86_R$. Variable chamber $86_S$ receives pressurized fluid via inlet conduit 88 from a speed servosystem schematically illustrated at 90. The piston 84 has a bleed passage 92 connecting variable chamber $86_S$ with $86_R$. Variable chamber $86_R$ is connected to a return conduit 96 connected to the speed servosystem. It is noted that the face of the piston 84 exposed to variable chamber $86_S$ has a smaller area than the face of the piston exposed to variable chamber $86_R$. The differential pressure across the piston and thus the resultant force differential across the piston is varied by controlling the flow of fluid back to the speed servo system to linearly displace the piston 84 in the chamber 86. For example, if flow to servosystem 90 is terminated, the pressure in variable chamber $86_R$ builds up to displace the piston 84. When the flow to the servosystem 90 is at a maximum, the pressure in variable chamber $86_R$ is reduced to permit the pressure in variable chamber $86_S$ to displace the piston downward. This flow is controlled by the speed servosystem 90 which receives actual speed inputs from a mechanical connection to the engine and scheduled inputs from an operator control lever 98.

The above mechanism displaces shaft 78 longitudinally. Shaft 78 also has a lateral integral shaft 100 adapted to swing shaft 78 with respect to pivotal mounting shaft 80. Shaft 100 has a sleevelike follower 102 received in an elongated slot 104 of a T-shaped plate 106. A lever 108 is pivotally connected to the T-shaped plate at 110 and to a suitable base bracket at 112. A second link 114 is pivotally connected to the opposite end of plate 106 at 116 and to a shaft 118 journaled for rotation in a housing 120. A spring 122 connected to an integral extension 124 of lever 114 connects with a fixed bracket 126 to bias the linkage. Shaft 118 has a lateral arm 128 within a chamber 130. Arm 128 is pivoted by a shaft 132 extending from a temperature-responsive bellows assembly 134. The bellows 134 expands or contracts in response to variations in temperature. Conduits 136 and 138 respectively carry inlet air from the engine to chamber 130 and out to a suitable exhaust so that chamber 130 is at the same temperature as that in the inlet of the engine.

Cam plate 68 has a first cam surface 140 which is abutted by follower 62. The cam plate 68 has a second cam surface 142 which is abutted by a ball-type follower 144 secured to an arm 146 by threaded shaft 148. Arm 146 is pivotally secured to a housing at 150 and through an arm 152 provides a control input to an inlet guide vane control system 154.

As stated previously, cam plate 68 moves in a first direction in response to linear displacement of piston 84 along its axis. The cam plate 68 also receives a displacement in a second direction in response to movement of the T-shaped plate 106 which pivots shaft 78 about its support 80.

The flat back 70, the two tips 72 and the base of shaft 78 define a reference plane in which the cam plate is displaceable. The contoured cam surface 140 is defined by a first set of curves $C_1$ (only one of which is shown) whose distance from the reference plane defines the relationship between the linear displacement of piston 84 and the displacement of follower 62 relative to the reference plane. The curves $C_1$ in this set extend along rays on the cam surface 140 which converge at the pivotal mounting shaft 80. It should be apparent that if the length of shaft 78 is great the curves $C_1$ will approach a condition of parallelism.

The contoured cam surface 140 is also defined by a second set of curves $C_2$ (only one of which is shown) whose distance from the reference plane defines the relationship between the pivotal displacement of shaft 78 about shaft 80 and the displacement of follower 62 relative to the reference plane. The curves $C_2$ in this set extend along arcs on the cam surface 140 having a common center at pivotal shaft 80. As the length of shaft 78 is increased, the degree of curvature of the arcs becomes smaller and smaller and the arcs approach a condition of straight parallel lines.

The sets of curves $C_1$ and $C_2$ cause the displacement of follower 62 relative to the reference plane to be a combined function of the linear and pivotal displacement inputs. It should be pointed out that while the reference plane is illustrated as being defined by the flat back face 70, the tips 72 of the cam guides and the base of shaft 78, it may be defined by any other plane parallel to the plane in which the cam plate 66 is guided for movement.

The contoured cam surface 142 is also defined by first and second sets of curves which define the relationship between the displacement of follower 144 relative to the reference plane and the linear displacement of piston 84 and the pivotal displacement of shaft 78 as a combined function.

In operation, the speed servosystem 90 receives operator inputs to displace piston 84 longitudinally, thus causing follower 62 to be displaced in response to movement of the cam surface 140 in that direction. At the same time variations in inlet air temperature sensed in chamber 130 causes follower 102 to be moved from side to side causing shaft 78 to pivot. This causes the follower 62 to be displaced in response to variations in inlet air temperature at the same time it is being displaced in response to the speed servo input. As a result, the displacement of follower 62 is a combined function of the linear displacement of piston 84 and pivoting displacement of shaft 78. A similar relationship holds true for follower 144 which provides an input to inlet guide vane control system 154.

The cam described above is positively supported by the cam support tips 72 to insure that it remains in the same plane during its movement irrespective of the varying pressure of the followers 62 and 144. Furthermore, the adjustable feature of cam supports 72 enables the plane of displacement of the cam plate 68 to be precisely selected. The cam surface described above has the potential of easy formation by electrochemical machining processes which are not as readily adaptable to formation of circular type cams. The two inputs to the cam have been illustrated as linear and pivoting. It should be apparent to those skilled in the art that other types of input displacements can be used with equal success.

Having thus described the invention, what is claimed as novel and desired to be secured by Letters Patent of the United States is:

1. A control system providing a displacement output as a function of two displacement inputs, said system comprising:

a cam plate having a contoured cam surface on one face thereof;

means for supporting said cam plate for movement in a given reference plane;

means for displacing said cam plate in a first direction in said reference plane in response to a first displacement input;

means for displacing said cam plate in a second direction in said reference plane in response to a second displacement input;

a follower abutting said cam surface and displaceable in a direction generally normal to said reference plane;

said contoured cam surface defined by first and second sets of curves whose distance from said reference plane respectively define the relationship between the first displacement input and the displacement of the output follower and the relationship between the second displacement input and the displacement of the output follower;

whereby displacement of said output follower is a combined function of the first and second displacement inputs.

2. A control system as in claim 1 wherein:

said first displacement means linearly displaces said cam plate; and said second displacement means pivotally displaces said cam plate.

3. A control system as in claim 2 wherein said means for supporting said cam plate for movement in given reference plane comprises:
   a flat reference surface on the opposite face of said cam plate;
   at least two low-friction fixed supports having tips against which said flat surface abuts for movement, said tips and said flat surface defining said reference plane; and
   means for urging said cam plate against said supports.

4. A control system as in claim 1 wherein said first displacement means comprises:
   a piston displaceable in a chamber in said first direction; and
   a shaft rigidly connected to said cam plate and connected to said piston.

5. A control system as in claim 4 wherein said second displacement means comprises:
   a pivotal connection between said shaft and said piston; and
   an arm extending generally laterally from said shaft and displaceable in an arclike pattern defining said second direction of movement for said cam plate.

6. A control system as in claim 5 wherein said second displacement means further comprises:
   an element displaceable in a plane parallel to the plane defined by the pivotal movement of said shaft, said element having an elongated slot receiving said arm, said slot extending lateral to the movement of said element thereby compensating for variations in height of said arm as said shaft pivots.

7. A control system as in claim 5 further comprising:

an elongated pivotal arm having its free end connected to said cam follower, said arm being pivotal to displace said follower generally normal to said reference plane; and
   means for yieldably urging said follower against said cam surface.

8. A control system as in claim 7 wherein said means for supporting said cam plate for movement in said reference plane comprises:
   a flat reference surface on the opposed face of said cam plate; and
   at least two fixed supports having low-friction tips against which said flat surface abuts, said tips, said flat surface and the connection to said piston defining said reference plane.

* * * * *